United States Patent
Purtell, II et al.

(10) Patent No.: US 8,065,687 B2
(45) Date of Patent: Nov. 22, 2011

(54) BYPASS VIRTUALIZATION

(75) Inventors: Thomas Joseph Purtell, II, San Francisco, CA (US); Won Chun, Manhasset, NY (US); Michael Carbin, Fremont, CA (US)

(73) Assignee: moka5, Inc., Redwood City, CA (US)

( * ) Notice: Subject to any disclaimer, the term of this patent is extended or adjusted under 35 U.S.C. 154(b) by 990 days.

(21) Appl. No.: 11/970,500

(22) Filed: Jan. 7, 2008

(65) Prior Publication Data
US 2008/0168479 A1 Jul. 10, 2008

Related U.S. Application Data

(60) Provisional application No. 60/883,742, filed on Jan. 5, 2007.

(51) Int. Cl.
G06F 13/00 (2006.01)
(52) U.S. Cl. .............................. 719/319; 719/328; 718/1
(58) Field of Classification Search .................. 719/319, 719/328; 718/1
See application file for complete search history.

(56) References Cited

U.S. PATENT DOCUMENTS

| | | | |
|---|---|---|---|
| 5,961,582 A * | 10/1999 | Gaines | 718/1 |
| 7,793,279 B1 * | 9/2010 | Le et al. | 717/168 |
| 7,877,747 B2 * | 1/2011 | Magenheimer | 718/1 |
| 2006/0101189 A1 | 5/2006 | Chandrasekaran et al. | |
| 2006/0277542 A1 | 12/2006 | Wipfel | |
| 2007/0006205 A1 | 1/2007 | Kennedy et al. | |
| 2007/0089111 A1 | 4/2007 | Robinson et al. | |
| 2007/0162521 A1 | 7/2007 | Raghunath | |
| 2007/0198713 A1 | 8/2007 | Tsao et al. | |
| 2008/0104588 A1 | 5/2008 | Barber et al. | |

FOREIGN PATENT DOCUMENTS

| | | |
|---|---|---|
| JP | 2006072591 A | 3/2006 |
| WO | 2006/036277 A2 | 4/2006 |
| WO | 2007/149671 A2 | 12/2007 |

* cited by examiner

*Primary Examiner* — Andy Ho
(74) *Attorney, Agent, or Firm* — Park, Vaughan, Fleming & Dowler LLP

(57) ABSTRACT

Embodiments of the present invention comprise methods and systems for augmenting machine virtualization by entirely bypassing resource emulation for performance-critical features, such as 3D graphics acceleration, through the use of high-performance interfaces between the guest OS and the host OS. Embodiments of the present invention also comprise methods and systems for ameliorating the performance penalties and functionality restrictions of conventional resource emulation.

14 Claims, 10 Drawing Sheets

BYPASS VIRTUALIZATION

RELATED APPLICATION

This application claims the benefit of priority to U.S. provisional application having Ser. No. 60/883,742, filed Jan. 5, 2007, the specification of which is incorporated herein by reference in its entirety.

TECHNICAL FIELD

This invention generally relates to computer software, and more particularly to methods and systems for virtualization.

BACKGROUND

Machine virtualization nests a guest operating system ("OS") within a host OS by running the guest OS on top of a virtual machine monitor ("VMM"), a.k.a. "hypervisor," e.g., VMware® Player or Virtual PC. The VMM provides resource emulation for the guest OS so that the guest OS can transparently utilize host OS resources—e.g., CPU, RAM, graphics or audio drivers and hardware, software or firmware interfaces to data stores or network interfaces, peripheral devices and their drivers—anything that the guest OS might need to run, outside of the VMM itself.

Unfortunately, emulation of a resource typically carries a performance penalty for the guest OS. Furthermore, emulation also often restricts functionality. In current VMM implementations, emulated graphics device lack high-performance features, e.g., 3D capabilities or video acceleration. Thus playing most modern 3D computer games is essentially impossible because such games depend on high-performance 3D acceleration. This limitation constrains potential use and deployment of virtual machines.

SUMMARY

Embodiments of the present invention comprise methods and systems for augmenting machine virtualization by entirely bypassing resource emulation for performance-critical features, such as 3D graphics acceleration, through the use of high-performance interfaces between the guest OS and the host OS. Embodiments of the present invention also comprise methods and systems for ameliorating the performance penalties and functionality restrictions of conventional resource emulation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Introduction

Figure 1:
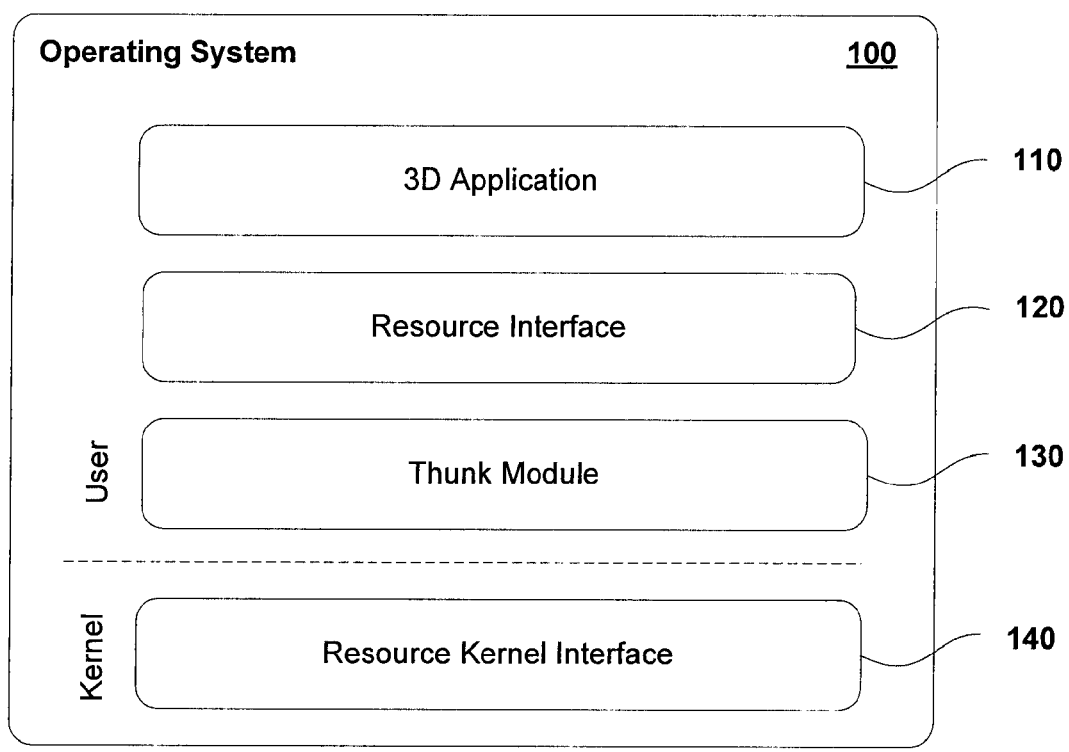
FIG. 1 illustrates a software stack for an operating system.

Bypass virtualization avoids the performance penalties and functionality restrictions of conventional resource emulation by a VMM by bypassing the VMM—requests issued by a guest OS for a host OS resource are instead channeled through the Bypass Interface. The Bypass Interface intercepts the requests, forwards them to the host OS, which passes the request on to the actual resource, and then the returns the response from the host OS resource to the guest OS. Since is unnecessary to implement the Bypass Interface for every OS resource, problematic or performance-insensitive resources can be handled with machine virtualization.

Good candidate resources for bypass virtualization have at least two qualities: (1) their behavior can be expressed within a small, well-defined interface; and (2) their state can be easily encapsulated and manipulated. These resources should not rely heavily on an implicit or global state.

3D graphics adapters are an excellent candidate for bypass virtualization. 3D graphics adapters typically have a small, well-defined interface consisting of a few standard user libraries. Furthermore, these libraries already adopt the notion of a rendering context that encapsulates a 3D rendering state to allow several 3D applications to share access to the 3D graphics adapter. Calls to Direct3D affect only a single rendering context at a time. The Direct3D kernel interface can manage rendering contexts to insulate each one from others. Rendering contexts provide a logical view of the underlying 3D graphics adapter which substantially simplifies the task of bypass virtualization. In a sense, 3D graphics adapters are already virtualized by Direct3D. With bypass virtualization, sharing the 3D graphics adapter extends to 3D applications running within virtual machines, as well.

Direct3D surfaces are memory regions where data transactions take place. Images, geometry data, shader programs and command buffers can be transferred from the application to Direct3D using surfaces. Surfaces may reside in user process memory, video memory, or both. Surfaces tend to be large (e.g., on the order of megabytes), and may be frequently copied to the 3D hardware (e.g., procedurally generated geometry data such as shadow volumes). Much of Direct3D's design is dedicated to optimizing surface data transfer. Therefore, in the interests of achieving good performance, transferring surface data over the Bypass Interface should be efficient.

The frame buffer (e.g., a buffer storing pixels eventually destined to be displayed on a monitor) can be represented by a special Direct3D resource: the primary surface, which can represent the actual display device. The primary surface presents special challenges to bypass virtualization that will be discussed below.

Example

Direct3D in Windows XP

Direct3D (part of the DirectX Application Programming Interface ("API")) is a 3D hardware resource that provides an interface for access to the advanced graphics capabilities of a 3D graphics adapter for high-performance rendering of 3D graphics. Some of the embodiments of the invention described below are related to Direct3D in Windows XP. Those embodiments are purely exemplary, and the invention is not limited to the embodiments described herein; the disclosed invention is applicable to other resources as well.

FIG. 1 illustrates a software stack for an operating system. FIG. 1 represents a typical implementation of Direct3D in Windows XP. In the example shown, a Windows XP environment 100 includes a 3D application 110 which communicates with a Direct3D resource interface 120. Direct3D resource interface 120 communicates with a Direct3D resource kernel interface 140 through a thunk module 130. The thunk module 130 is a user-space library, e.g., D3D8THK.DLL, that translates normal requests into system calls to the Direct3D resource kernel interface 140.

Different versions of the Direct3D resource interface 120 are implemented through different interface libraries. For example, Direct3D version 8 uses D3D8.DLL, while Direct3D version 9 uses D3D9.DLL. The Direct3D resource interface 120 is a stable, well-documented interface targeted at software vendors, such as game developers. Microsoft implements each version of Direct3D as a distinct library with different interfaces. Newer versions expose new functionality (e.g., pixel shaders) and deprecate older, poorly supported features (e.g., fixed-function bump-mapping). Direct3D resource interface 120 translates high-level requests made by the 3D application 110 into low-level requests handled by the Direct3D resource kernel interface 140. The Direct3D resource kernel interface 140 is a kernel module that communicates with the actual 3D graphics adapter.

There is no simple correspondence between Direct3D resource interface 120 and Direct3D resource kernel interface 140. For example, the Direct3D resource interface 120 exposes many drawing functions to 3D application 110 and offers automatic resource management. By contrast, the Direct3D resource kernel interface 140 chiefly traffics in command buffers, which may include several drawing and resource commands batched together. The Direct3D resource interface 120 implementation assembles command buffers from sequences of application requests and performs automatic resource management.

Exemplary Embodiment

Bypass Virtualization of Direct3D

Figure 2:
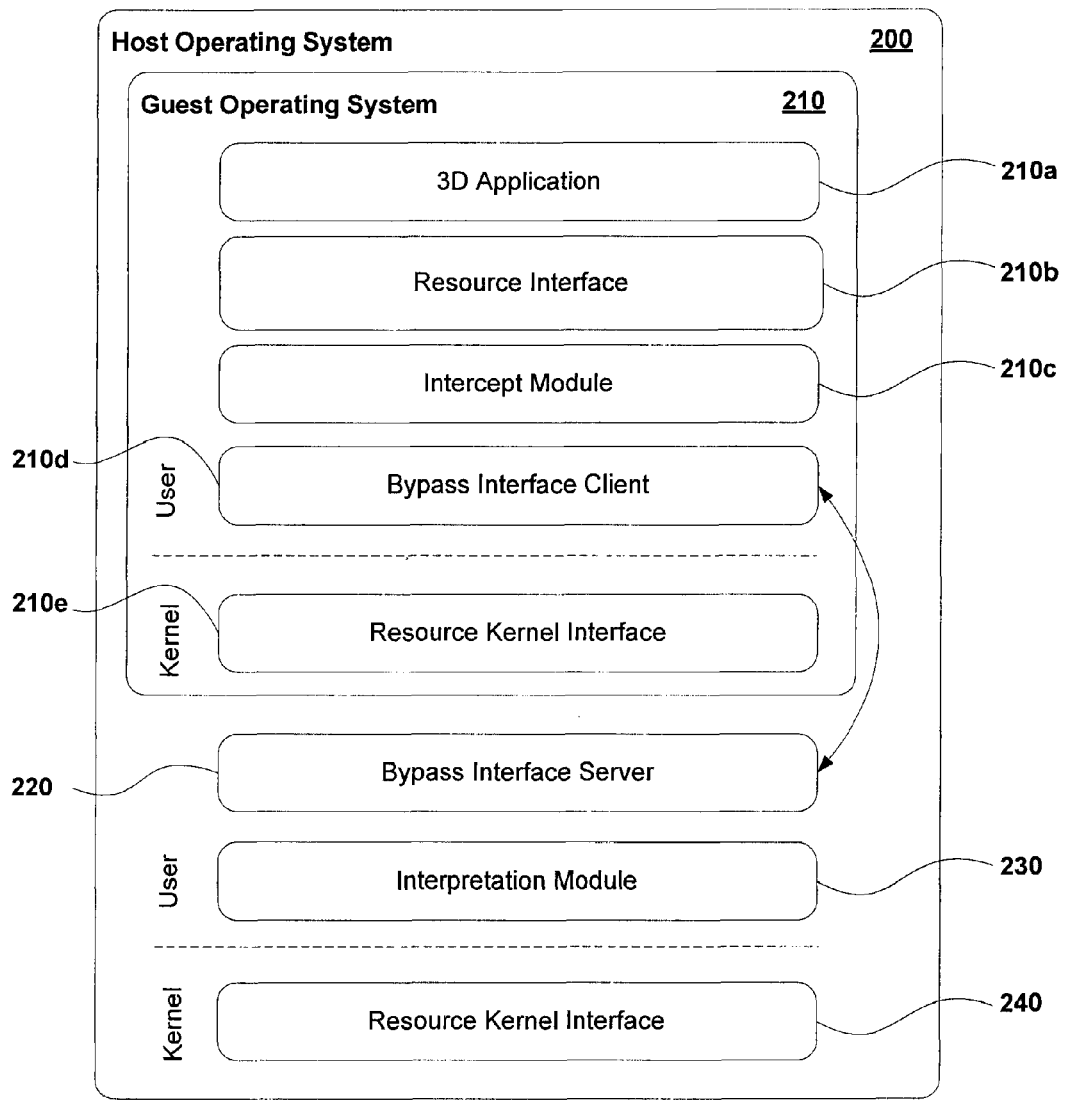
FIG. 2 illustrates an embodiment of bypass virtualization as applied to a software stack in a guest OS.

FIG. 2 illustrates an embodiment of bypass virtualization as applied to a software stack in a guest OS. A guest OS 210 is nested within a host OS 200. Within guest OS 210, 3D application 210a passes requests to Direct3D resource interface 210b. Direct3D resource interface 210b passes a request intended for Direct3D resource kernel interface 210e that is intercepted by intercept module 210c. Instead of simply passing the calls to the Direct3D resource kernel interface 210e, intercept module 210c passes the calls to Bypass Interface client 210d. Bypass Interface client 210d is the module in guest OS 210 that provides an efficient communication channel to host OS 200. The host counterpart of Bypass Interface client 210d is Bypass Interface server 220. Bypass Interface client 210d on guest OS 210 forwards the requests to Bypass Interface server 220 on host OS 200; the requests are then sent through interpretation module 230 in the host (typically implemented in place of the host thunk module, e.g., D3D8THK.DLL) and ultimately to Direct3D kernel interface 240 in the host. In addition to replacing an entire module (as with the thunk module in the guest OS that is replaced by intercept module 210c), it is possible to intercept calls to an existing module using many additional techniques including but not limited to IAT patching or rewriting request entry points (e.g., Microsoft™ Research's Detours).

For Direct3D, it is most appropriate to implement the intercept module in place of the thunk module 130 shown in FIG. 1. The original thunk module (e.g., D3D8THK.DLL) may be replaced with an intercept module 210c comprising a proxy thunk module that exposes the same API as the original thunk module but provides a different implementation. One of ordinary skill in the art will recognize that the intercept module 210c and Bypass Interface client 210d can be implemented in the same module (e.g., a dynamically link library ("DLL")).

Although Direct3D resource interface 210b may be simpler to comprehend and more thoroughly documented, the above approach reuses the sophisticated batching and resource management handled at the resource interface level by preserving the Direct3D resource interface at 210b. A single proxy thunk module implementation can be shared for several versions of Direct3D, because many versions of Direct3D differ only in the resource interface and actually use the same library implementation in the thunk module. Another, more conventional, approach would be to build a guest device driver for a virtual 3D graphics adapter. However, there is little reason to implement the driver interface instead of a proxy thunk module. Their interfaces are actually very similar, and a proxy thunk module, which resides in the user space, avoids problematic kernel development.

Those of skill in the art are aware that although Bypass Interface client 210d is represented by a single module in FIG. 2, the functionality within that module may be further broken down into smaller units (e.g., a forwarding module that handles the forwarding of intercepted requests and a response module that monitors the forwarded intercepted calls and sends the responses corresponding to the forwarded calls back to the application associated with those requests) Those of skill in the art are also aware that although Direct3D utilizes an API, other resources may use other types of interfaces. The present invention is applicable to all types of interfaces (including APIs) for all types of resources.

Figure 5:
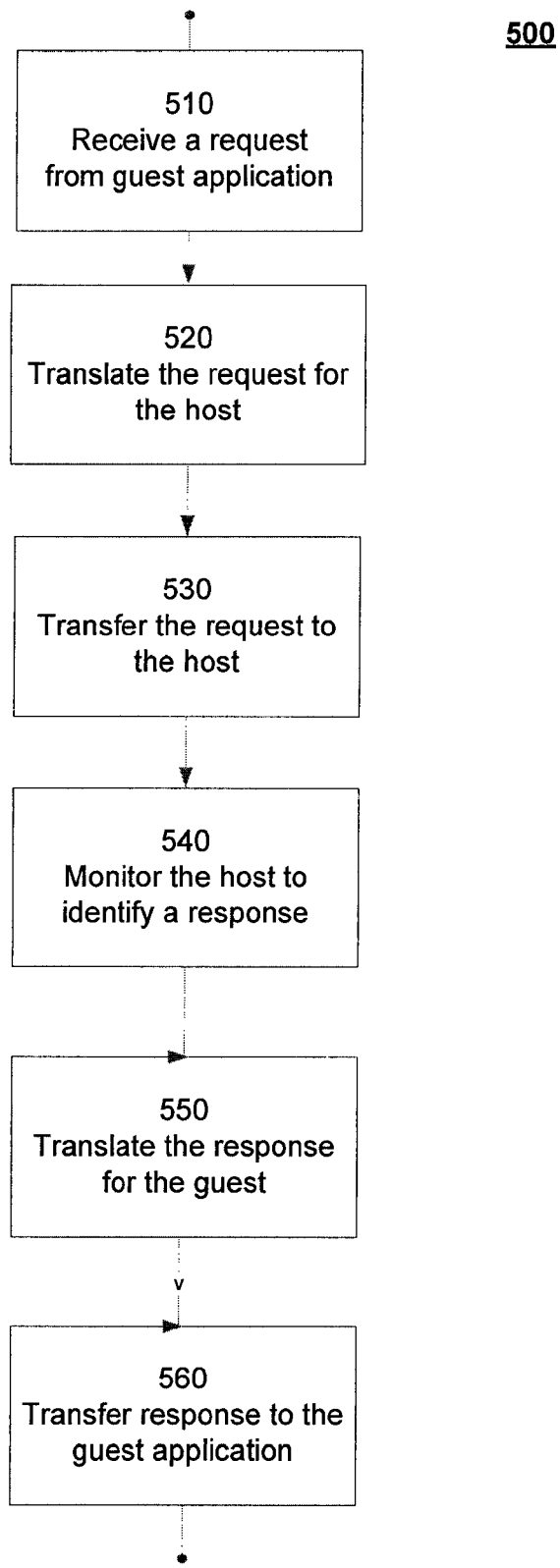
FIG. 5 illustrates a flow of the steps in bypass virtualization.
Figure 6:
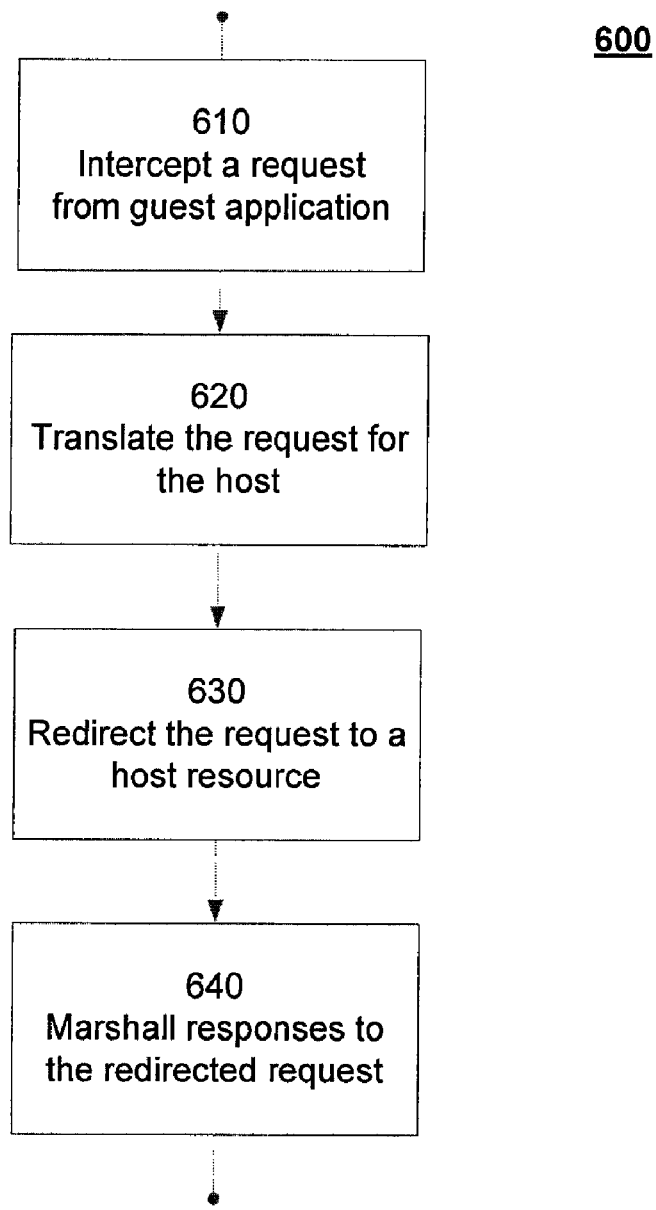
FIG. 6 illustrates a flow of the steps in bypass virtualization.

The Bypass Interface is so named because it completely bypasses Direct3D resource kernel interface 210e. In fact, Direct3D resource kernel driver 210e need not exist. FIG. 5 and FIG. 6 illustrate a flow of the above-described steps in bypass virtualization.

The following section details the actual mechanism of the Bypass Interface.

The Bypass Interface

The Bypass Interface is similar to a remote procedure call (RPC) interface between the guest OS and the host OS. The Bypass Interface is used to pass requests from the guest to the host, and correspondingly pass return values from the host to the guest. The guest is the RPC client, the host is the RPC server. Customarily the RPC client and server reside on two physically separate machines, but the Bypass Interface adds a slight twist. The client and server are on the same physical machine, but the client is running in a virtual machine.

One embodiment of the Bypass Interface for a resource, such as Direct3D, comprises three major components. The first major component is a communication mechanism between the virtual domains. The communication mechanism can be used for implementing the Bypass Interface, the memory sharing service, or other services. The communication mechanism is a generic component that is not tied to any specific type of resource.

The second major component is a memory sharing service that enables the mapping of buffers between different virtual domains. The memory sharing service is also a generic component that is not tied to any specific type of resource.

The third major component is an resource-specific proxy module that converts a normal request into a RPC (e.g., proxy D3D8THK.DLL), to be sent via the communication mechanism. Implementing the proxy thunk module requires detailed knowledge of the semantics of the API. For example, it is no longer possible to pass arguments by pointer because the client and server may reside in separate memory spaces.

Communication Between Guest and Host Using Message Passing

In one implementation, the RPC between the guest OS and the host OS can be implemented using message passing components. One approach is to make use of the VMM-emulated network between the guest OS and the host OS. A TCP/IP socket can connect the guest OS with the host OS. In VMware Player, a more efficient variation uses a virtual serial port in the guest. The virtual serial port is implemented as a named pipe in the host. Using a pipe instead of a socket avoids network protocol overhead.

Sockets and pipes are essentially message passing interfaces that have intrinsic overhead. Even when both endpoints are located on the same machine, a message passing implementation often requires the creation of one or more copies of the communicated data. To send a buffer of data from one process (sender) to another process (receiver) using a pipe, the OS copies the data from the sender into an internal buffer, then copies the data from the internal buffer to the receiver. For large data buffers, such as Direct3D surfaces, the copying overhead can be substantial.

Memory Sharing Service

A shared memory implementation does not require copies of data. If multiple processes can access the same physical memory, then changes made in one process will be visible to all processes. A message passing implementation can only pass arguments by value (i.e., a copy), but a shared memory implementation may also pass arguments by reference (i.e., the address). For large data buffers, such as Direct3D surfaces, passing arguments by reference rather than value can be substantially more efficient.

The difficulty in providing communication between the guest and the host via shared memory is due to the fact that the guest and the host operate in different virtual address spaces. Virtual memory ("VM") is a mechanism that decouples memory addresses from memory locations. Instead of addressing physical memory directly, a process accesses memory using a virtual address space. A VM system automatically manages a number of details for individual processes, such as memory protection, process isolation, and swapping memory to disk.

Most current implementations of virtual memory divide the address space into fixed-size blocks called pages. On x86, the typical page size is 4 KB (4096 bytes). Each page in virtual address space represents (at most) one page of physical memory. The mapping between virtual pages and physical pages, encoded in the page table, is arbitrary and variable. Two adjacent pages in virtual address space (e.g., addresses 4096 and 8192) are not necessarily (and not typically) adjacent in physical address space. Unused pages may be swapped to disk rather than left to occupy precious RAM.

Sharing memory between the guest and the host consists of the following tasks: (1) locking the guest's shared pages in the guest OS for the duration of the communication; and (2) mapping shared buffers that occupy a set of contiguous pages in the guest's virtual address space to a set of contiguous pages in the host's virtual address space and vice versa.

Locking Shared Pages in the Guest

For the guest to share its pages with the host, the guest must lock the set of shared pages for the duration of the communication. The guest can unlock the set of shared pages after the communication is completed.

It is important that the set of shared pages remain locked even under exceptional conditions. For example, if the guest process crashes, all manually locked memory pages will be unlocked. This can cause a problem if the host process tries to write into any page of the unlocked set of shared pages. Because the OS attempts to recycle unused pages, these pages may now belong to a different guest process, leading to memory corruption in that guest process.

An approach to robustly prevent such memory corruption is to use a guest kernel interface that manages the locked set of shared pages on behalf of the guest process. The guest kernel interface waits until communication with the host is done before unlocking the set of shared pages.

Handling Buffers Spanning Contiguous Pages

Contiguous mapping is an important property. Elements in arrays and data structures are typically linearly addressed as address-offset pairs; this requires that addresses be contiguous. Many resources require linear addressing for large structures (e.g., Direct3D surfaces), which complicates the task of implementing a Bypass Interface for such resources.

Efficiently implementing an accelerated service across virtual domains can require sharing contiguous virtual address space between separate virtual domains (e.g., where the host OS is running a VMM such as VMware Workstation, and a Linux guest OS is running on top of the VMM). This requirement arises because a buffer that was being passed to a user-mode resource interface in one domain will be passed to another user-mode resource interface in another domain, and both resource interfaces require contiguous buffers. Providing a memory sharing service either as an extension for a VMM (i.e. the detailed methods described above), as part of a hypervisor, or as part of a VMM can support the efficient implementation of higher-level paravirtual services (e.g. GDI, Direct3D, printer, sockets).

Figure 7:
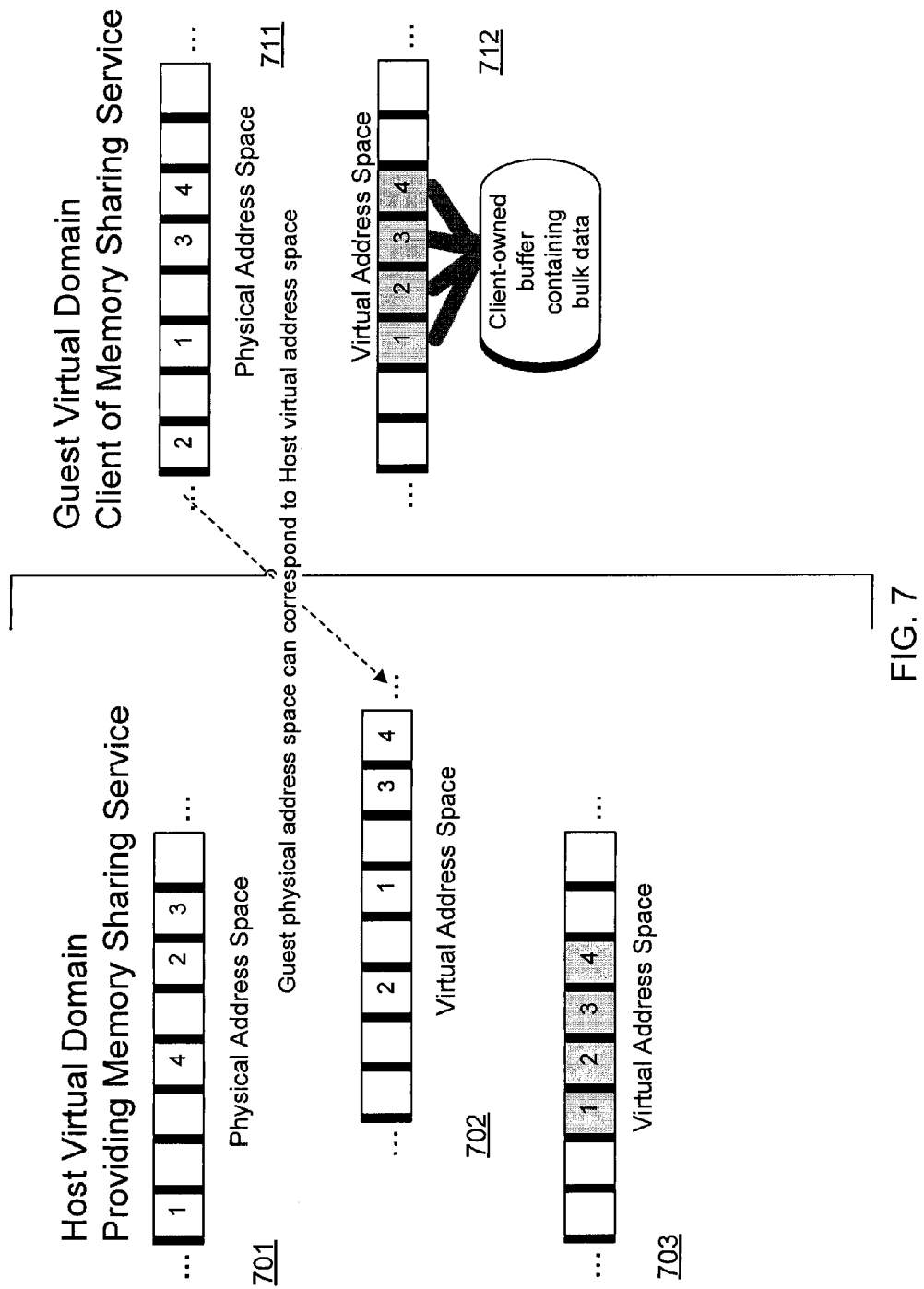
FIG. 7 illustrates a guest sharing a buffer in the hosted virtualization context.

Contiguous virtual address space includes buffers in kernel mode, buffers in user mode, and buffers in memory behind busses in the computer system. Buffers that are smaller than the processor page size and are properly aligned are intrinsically contiguous even in physical address space. Buffers larger than a page are regularly used as resource parameters. For example, FIG. 7 illustrates a guest sharing a buffer in the hosted virtualization context. Buffer 712 (e.g., a texture used to render a 3D scene) is contiguous in guest virtual address space that an application (e.g., Half-Life 2, a video game) has allocated (e.g. pages numbered 1, 2, 3, and 4). This buffer occupies four physical processor pages of memory. Buffer 711 shows that these pages can be scattered (not contiguous) in physical address space.

Software (e.g., Windows XP's virtual memory subsystem) running inside a virtual domain can control the mapping of virtual address space to physical address space. A hypervisor or VMM (e.g., VMware Player, Xen) can control the mapping of physical address space of one or more virtual domains to the physical address space of the physical machine. The memory sharing service can provide a mechanism for software running in a virtual domain to assign a name to one or more buffers in the address space of that virtual domain. The service can provide a mechanism for another virtual domain to map one or more named buffers into the address space of this second virtual domain. A named buffer can be shared with one or more additional virtual domains. These virtual domains can be located in the same physical machine.

A memory sharing service can allow a virtual domain to specify restrictions on which other virtual domains have the permission to access one or more named buffers. A memory service can allow virtual domains to specify what types of access (e.g., read-write, read-only) are allowed to one or more named regions. The service can allow a virtual domain to reassign the name for a particular buffer so that it represents the virtual address space defined by a second named buffer. A memory service can allow one or more virtual domain to issue memory barriers for one or more named buffers. Memory barriers can be used to allow unshareable regions of memory (e.g., a buffer in GPU memory which is not mapped by the VMM into physical address space of the guest virtual domain) to be transferred between virtual domains as infrequently as possible.

Sharing Between Virtual Domains (Hypervisor)

Figure 9:
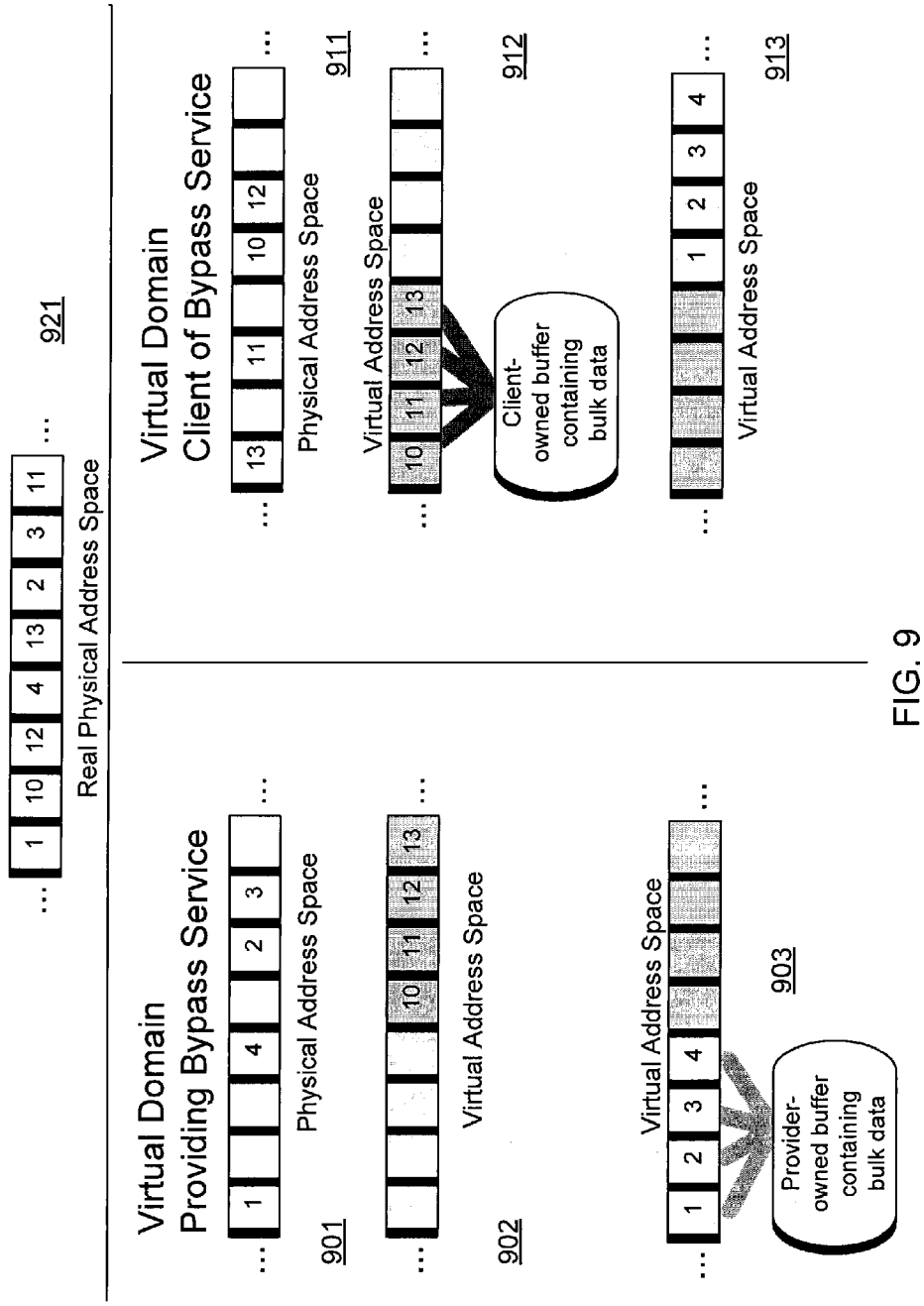
FIG. 9 illustrates sharing buffers in the hypervisor context.

A hypervisor can provide the capability for software to be run in separate virtual domains. The hypervisor provides memory management services suitable for managing shadow mappings for memory assigned to different virtual domains. FIG. 9 illustrates sharing buffers in the hypervisor context. In FIG. 9, buffer 921 shows an embodiment where the hypervisor owns real physical address. The memory sharing service is used to implement a bypass service. Physical address space of the service provider virtual domain (as shown in buffer 901) can contain a subset of the pages in the real physical address space. Physical address space of the service client virtual domain (as shown in buffer 911) can contain a subset of the physical pages in the real physical address space. Software in the bypass client virtual domain can request the memory sharing service to name a buffer 912 in virtual address space to be shared with other virtual domains. Software in the bypass provider virtual domain can request the memory sharing service to map the buffer into the address space of the bypass provider virtual domain resulting in buffer 902.

Software in the bypass provider virtual domain can likewise request the memory sharing service to name a buffer 903 in virtual address space to be shared with other virtual domains. Software in the client virtual domain can request the memory sharing service to map the buffer into the address space of the bypass client virtual domain resulting in buffer 913.

Sharing from the Guest Domain (Hosted Virtualization)

A hosted VMM (e.g. VMware Workstation) can provide the capability to execute software in separate virtual domains (e.g., guest virtual domain). In FIG. 7, buffer 711 shows the physical address space the VMM can provide to the guest virtual domain. The VMM runs inside the host virtual domain so all the resources exposed to the guest virtual domain can be accessible in the host virtual domain. The memory sharing service can map the guest virtual domain physical address space into virtual address space of the host virtual domain (as shown in buffer 702). For example, guest physical memory can be contained in an anonymous file mapping object created with the Win32 CreateFileMapping call which is later mapped into virtual address space of the host domain with the Win32 MapViewOfFile call. This virtual address space in the host domain can map to the physical address space of the host domain (as shown in buffer 701).

Software in the guest virtual domain can request the memory sharing service to name a buffer 712 in virtual address space to be shared with other virtual domains. Software in the host virtual domain can request the memory sharing service to map the buffer into the address space of the host virtual domain resulting in buffer 703. Buffers 702 and 703 refer to different regions of the same virtual address space of the host virtual domain.

Sharing from the Host Domain (Hosted Virtualization)

Figure 8:
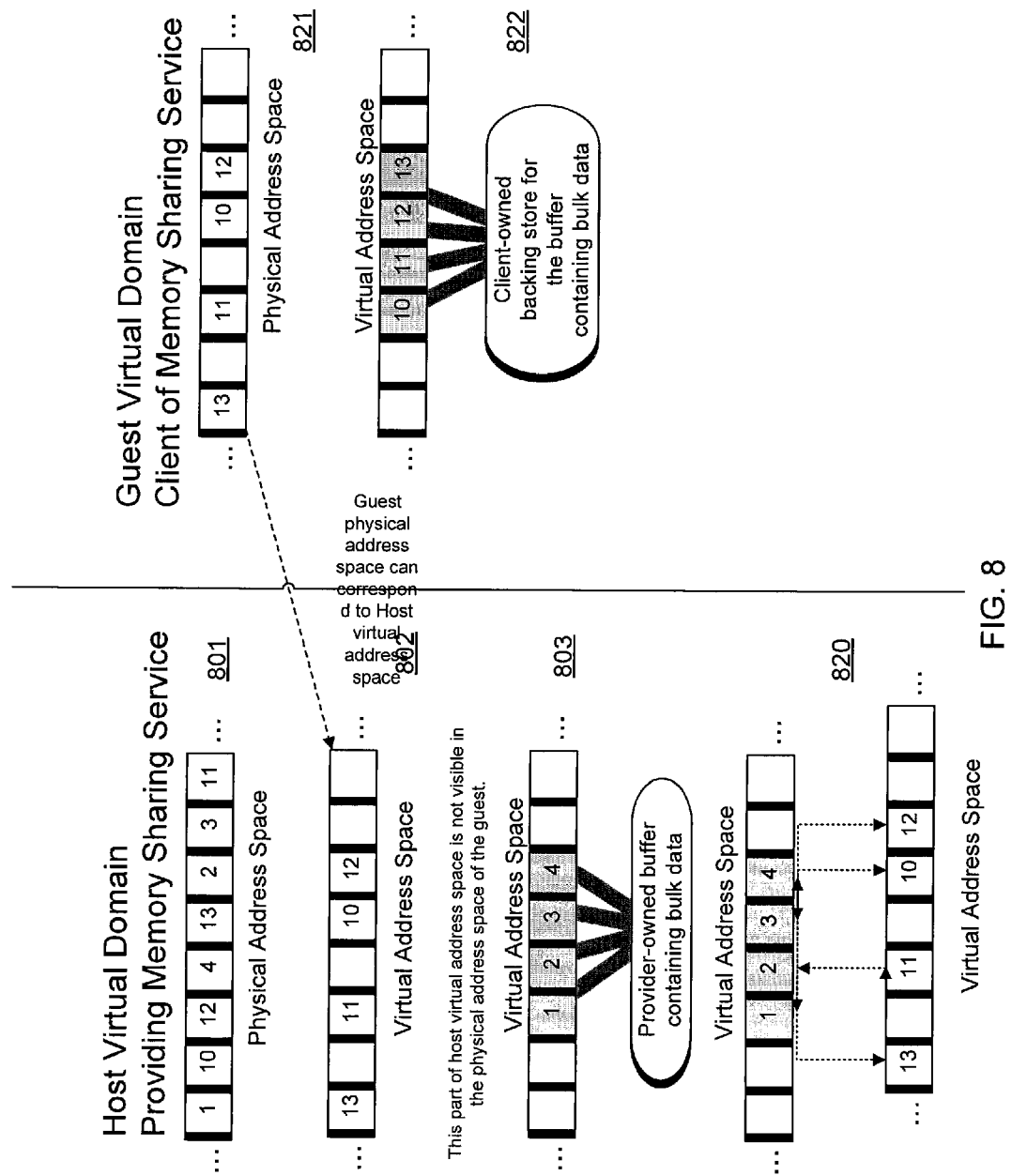
FIG. 8 illustrates a host sharing a buffer hosted virtualization context.

Some interfaces return newly allocated buffers to the resource client (e.g., a texture located in GPU memory can be mapped into virtual address space of the host virtual domain by a call to the NtGdiDdLock; the pointer to the buffer is part of the response). Performing bypass virtualization on these APIs can require a buffer created in the virtual address space host virtual domain to be passed to the guest. FIG. 8 illustrates a host sharing a buffer hosted virtualization context. The pages containing the buffer are not accessible in the physical address space of the guest virtual domain and the host virtual domain can request the memory sharing service to name the buffer 803. The guest (client) virtual domain can allocate a backing in guest virtual address space (as shown in buffer 822). The memory sharing service can map the guest virtual domain physical address space into virtual address space of the host virtual domain (as shown in buffer 802). The physical address space of the host virtual domain can contain the buffers allocated in both the guest and host virtual domains (as shown in buffer 801).

Software in the host virtual domains can request that a named buffer allocated in one virtual domain (e.g., the guest or the host) can be rebound to a named buffer allocated in another virtual domain (e.g., the host or the guest). Once the binding between a buffer and a backing store is established, software in a virtual domain can issue memory barriers so the system knows when to update the two respective views of the shared buffer.

Software in the host or guest virtual domains can request the memory mapping service to issue a read or write memory barrier. Issuing a memory barrier can trigger a copy of the region covered by the barrier, potentially a subset of the buffer. A read memory barrier can trigger a copy from the virtual domain owning the buffer to the virtual domain accessing the buffer. A write memory barrier can trigger a copy from the virtual domain accessing the buffer to the virtual domain owning the buffer. Software in host virtual domain can perform the transfers on behalf of the guest domain because it can gain access to the complete address space of both the guest and host virtual domains.

Creating a Proxy for a High-Level Interface

Figure 10:
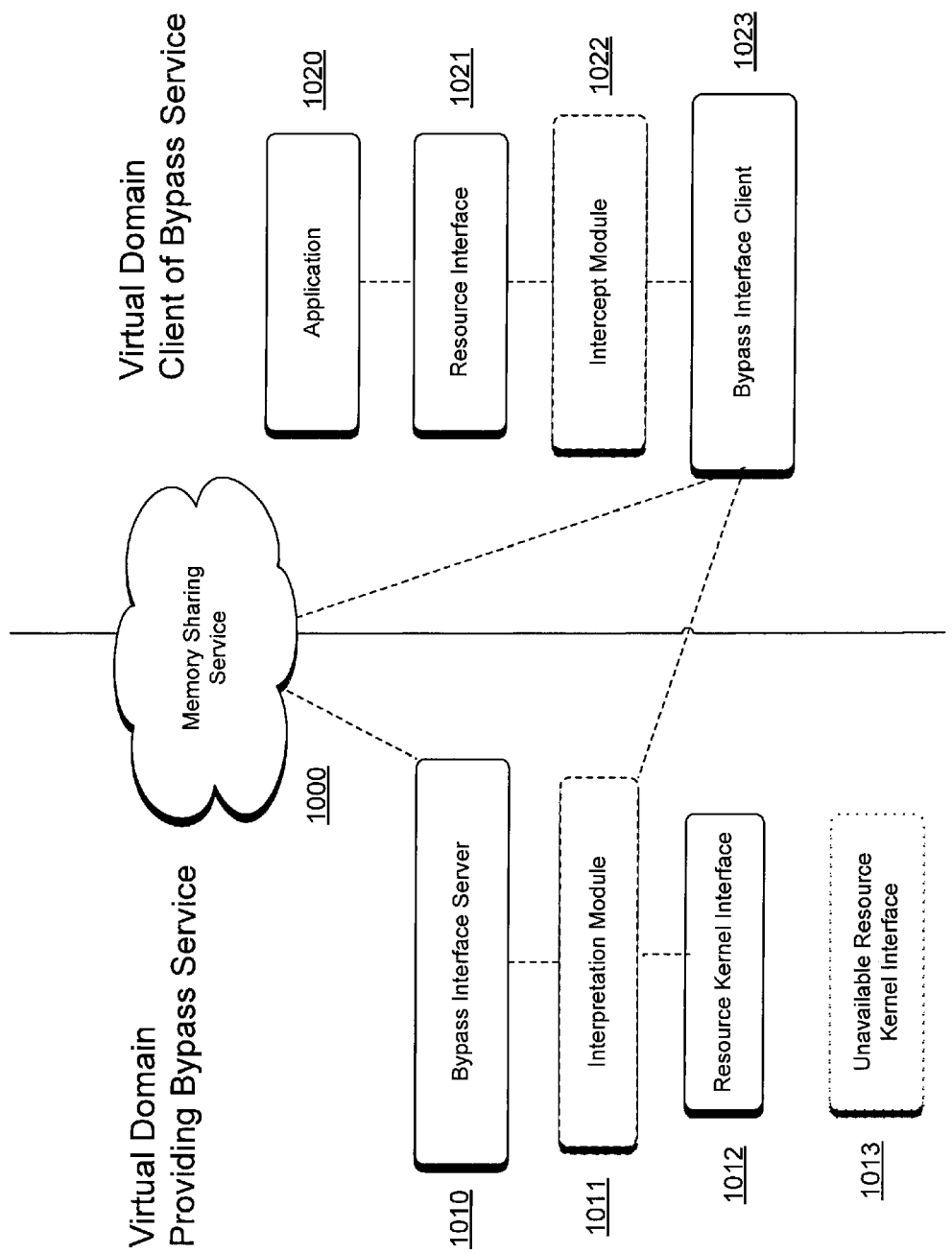
FIG. 10 illustrates the Bypass Interface incorporating memory sharing.

A bypass implementation of a resource can be implemented using the memory sharing service described above. FIG. 10 illustrates the Bypass Interface incorporating memory sharing. FIG. 10 is representative of the prototypical components of a bypass service implementation.

An application 1020 in the bypass client virtual domain can allocate buffers in guest virtual address space. The application 1020 can access a resource interface 1021 and pass buffers to the resource interface 1021. An intercept module 1022 can receive this and make a bypass request using the bypass functionality client 1023.

The Bypass Interface client 1023 can parse the structures and state for the request to determine which memory regions need to be shared. The Bypass Interface client 1023 can use high-level API knowledge to determine when to issue memory barriers by invoking the memory sharing service 1000 (e.g., a buffer passed to an API call as an input only requires one write memory barrier to be issued in the guest virtual domain). Additionally, the Bypass Interface client 1023 can use cached state information and OS interfaces (e.g., Win32 call GetWriteWatch) for memory monitoring to reduce the number of required memory barriers.

The Bypass Interface client 1023 can request the memory sharing service 1000 to name the buffers required for making the request to the Bypass Interface server 1010. After sharing the appropriate buffers and issuing the appropriate memory barriers the Bypass Interface client 1023 can make a request (e.g., RPC, shared memory pipe) to the Bypass Interface server 1010. The Bypass Interface client 1023 can embedded the names of the pertinent buffers in the request to the Bypass Interface server 1010.

The Bypass Interface server 1010 can request the memory sharing service 1000 to map the buffers used for the request into the virtual address space of the bypass provider virtual domain. The memory sharing service 1000 can also be invoked by the Bypass Interface server 1010 to perform memory barrier operation. The Bypass Interface server 1010 can invoke the interpretation module 1011. The Bypass Interface server 1010 can modify the pointers inside the data structures for the request so that they correspond to the shared regions mapped into the provider virtual domain's address space by the memory sharing server 1000. These address corrected data structures can eventually be passed to the underlying resource kernel interface 1012.

The interpretation module 1011 can buffer requests and can cache state information. It can emulate an unavailable resource kernel interface 1013 and can systematically modify requests based on cached state information. The interpretation module 1011 can serialize the state required to resume the execution of a Bypass Interface client virtual domain on a different physical machine if it were to have its execution paused. Finally, the interpretation module can invoke the resource kernel interface 1012 in the provider virtual domain to service the request made via the bypass interface.

When resource kernel interface 1012 responds, the results can be modified or cached by the interpretation module 1011, before they are returned to the Bypass Interface server 1010. The Bypass Interface server 1010 can invoke the memory sharing service 1000 to share provider-owned response buffers and data structures with the bypass client virtual domain. The memory service 1000 can also be invoked to issue any appropriate memory barriers. The Bypass Interface server 1023 can rewrite the pointers it previously modified to their original values to prevent unexpected alterations to bypass client domain behavior (i.e., bugs from modified pointers being reused by code executing in the guest virtual domain). The Bypass Interface server 1010 can provide the corrected response (e.g., via RPC or shared memory pipe) to the bypass functionality client 1023.

The Bypass Interface client 1023 can invoke the memory sharing service 1000 to attach a backing store to any named buffers returned as part of the response from the Bypass Interface server 1010. The memory sharing service 1000 can be invoked to issue memory barriers the Bypass Interface client 1023 deems necessary considering high-level API knowledge and cached state information.

The intercept module 1022 can inject or send the reply to the application 1020 for the original request to resource interface 1021 in the guest virtual domain.

Creating Correspondence Between Virtual Address Space in Guest to Virtual Address Space in Host.

One embodiment of a memory sharing service on a hosted VMM can take advantage of the DMA primitives provided by the VMM to translate virtual addresses from guest virtual domain address space to host virtual domain address space.

Using direct memory access ("DMA"), high-performance block I/O devices read and write data between the device and physical memory pages without CPU interaction. DMA is efficient because the CPU is freed from the task of transferring data and may accomplish other tasks during a DMA transaction. Usually, DMA transactions between a process and a block device are copied through a dedicated set of physical pages managed by the OS. This copy is necessary because the I/O may require access to arbitrary ranges (e.g., addresses 10000 through 20000) of virtual addresses that may only partially overlap with physical pages.

It is possible to avoid this intermediate copy when the memory ranges of an I/O are aligned to virtual pages. When a process requests a page-aligned I/O, the OS simply translates the virtual page addresses into physical page addresses and uses the physical addresses for the DMA transaction with the block device. The OS should also prevent the memory pages from being remapped for the duration of the transaction. As a result, the data is copied directly to (or from) process virtual memory.

Figure 3:
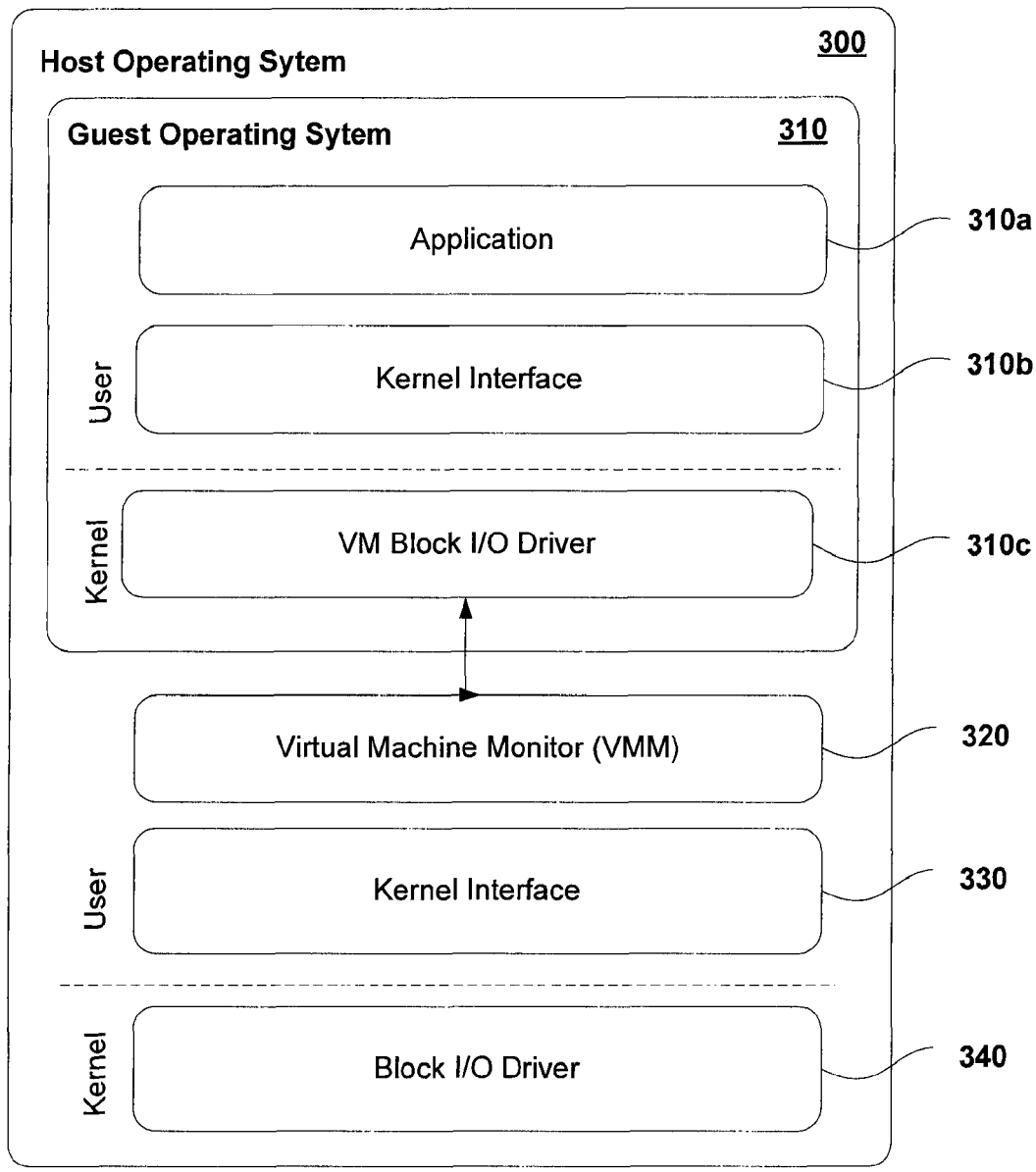
FIG. 3 illustrates an embodiment of a virtual block I/O (input/output).

This page-aligned DMA optimization not only exists for real block devices, but for virtual block devices as well. For example, the virtual SCSI devices in VMware player exhibit this behavior. When an application on a guest OS performs a DMA transaction with a virtual SCSI block device, a sequence of page address translations takes place. FIG. 3 illustrates an embodiment of a virtual block I/O (input/output). FIG. 3 represents a schematic of the various modules in which translation takes place during such a transaction. Guest OS 310 is nested within host OS 300. Application 310*a* initiates a DMA transaction to access certain virtual page addresses on guest 310. The guest virtual page addresses are passed through an I/O call in kernel interface 310*b*, where the addresses are translated to physical addresses located in the guest kernel, and then passed to VM block I/O driver 310*c*. VM block I/O driver 310*c* communicates directly with VMM 320 running on host OS 300, which translates the guest physical address into a host virtual address in the memory space of VMM 320. Finally, VMM 320 performs a real DMA transaction (through kernel interface 330 and block I/O driver 340 on the host OS) on behalf of application 310*a* on the guest OS.

Although each page address is translated to different address spaces several times, it refers to the same physical page. Therefore, changes to the data in those memory pages from any address space (virtual or physical, guest or host) are actually visible in all address spaces. When the host performs the DMA transaction on behalf of the guest, the results are also visible to the guest application. Careful manipulation of this behavior allows the guest to share memory pages with the host.

Figure 4:
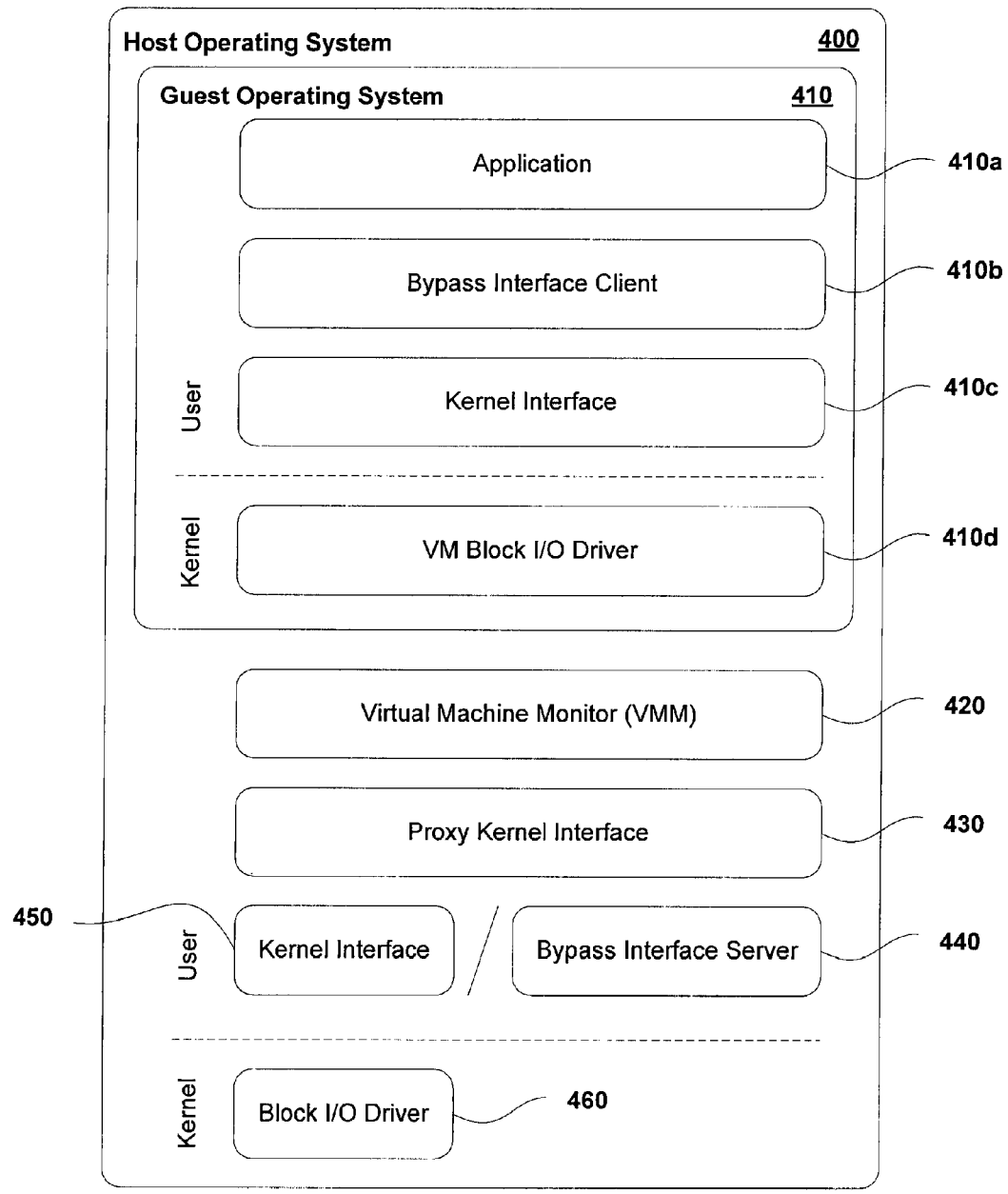
FIG. 4 illustrates an embodiment wherein memory pages are shared between a guest OS and a host OS using the virtual block I/O of FIG. 3.

Sharing memory pages requires cooperation between the guest OS and the host OS. FIG. 4 illustrates an embodiment wherein memory pages are shared between a guest OS and a host OS using the virtual block I/O of FIG. 3. FIG. 4 is a schematic representation of an implementation of a Bypass Interface between host OS 400 and guest OS 410 using shared memory pages. Application 410*a* on the guest sends a request to Bypass Interface client 410*b*. Bypass Interface client 410*b* manages communication on guest OS 410, and Bypass Interface server 440 manages communication on host OS 400. In some implementations, bypass Interface server 440 is in a separate process. To share memory pages, Bypass Interface client 410*b* issues specially formed I/O requests (e.g., a write operation through WriteFileGather) to dummy VM block I/O driver 410*d* via guest kernel interface 410*c* using virtual page addresses. The dummy I/O requests do not trigger DMA transactions; only the page address translation mechanism in guest kernel interface 410*c* is used.

The pages themselves contain their own virtual guest addresses (they may optionally contain other data). From VM block I/O driver 410*d*, the dummy request is forwarded to VMM 420 which attempts to service the I/O request using kernel interface 450 on the host. However, calls to kernel interface 450 are intercepted by proxy kernel interface 430 that shunts the dummy I/O requests to Bypass Interface server 440, which takes care of the ultimate DMA transaction with block I/O driver 460.

At the VMware Player process, the guest DMA page addresses have been translated into host virtual page addresses, but the DMA page contents still include the corresponding original guest virtual page addresses. The Bypass Interface server stores the mapping from guest to host virtual page addresses. To write data to a guest virtual address page in the future, the Bypass Interface server simply writes to the corresponding host virtual address page. Reading data is accomplished in like fashion.

Address Mapping Using a Host Kernel Interface

In one implementation of a memory sharing service, a host kernel interface is used to remap physical address space of the guest virtual domain into virtual address space of the host virtual domain. This driver can alter process page tables. Such a kernel interface can create a second, logical view in the Bypass Interface server process for each of the array and data structure parameters. Normally, the original guest pages can be randomly scattered in the Bypass Interface server's virtual address space. The kernel interface can create a new set of page table entries for the Bypass Interface server that preserves the contiguity and ordering of the request parameters in new, contiguous virtual address ranges. The Bypass Interface server can linearly address array and data structure parameters using these virtual address ranges. Furthermore, page table remapping preserves call-by-reference semantics because it creates new views, rather than copies, of the parameters.

Optimization: Reducing Page Address Translation

There is an overhead in translating the addresses back and forth between the guest and the host. One optimization is to amortize the overhead by performing only one translation across multiple calls.

One implementation of a communication mechanism can use a pool of shared pages. The pool of shared pages can be used as a circular queue. Passing a request comprises writing the function ID and arguments into the next available set of pages. Page address translation need not be performed every call because the correspondence between guest and host page addresses is already known for these pages.

Optimization: Making the Calls Asynchronous

If function calls can be deferred (e.g. non-blocking calls, most Direct3D client API calls), then many function calls can be batched into the queue. When the Bypass Interface client fills the queue or requires a return value, it sends a flush command to the Bypass Interface server using the notification mechanism. The Bypass Interface server responds to the flush notification after it has serviced all queued requests. By queuing requests, the address translation occurs once per flush notification rather than once per call.

The Bypass Interface server can actually begin servicing function call requests ahead of flush notifications. The server periodically polls the circular queue and services new requests, substantially decreasing the latency of function calls. If the Bypass Interface server runs in a different thread from the Bypass Interface client, function calls can be serviced concurrently with the rest of the virtual machine processing, increasing performance on multithreaded machines.

This polling mechanism is analogous to spin locks on multithreaded machines. As in spin locks, a process should only poll for a limited time before resorting to the slower notification mechanism. This limit is application- and load-specific. Heuristics may be used to adaptively define the spin count.

All the pointers and data structure offsets that the guest shares with the host need to be modified so that they point to the corresponding addresses in the host's virtual address space. Upon return, these pointers and offsets need to be reverted back to point to the guest's address spaces. Similarly, all the pointers the host wants to share with the guest need also be modified upon the return of the procedure call. Knowledge of data structures passed to the specific calls being invoked is used so as to identify all the pointers and offsets shared. In some implementations, the Bypass Interface server relocates the pointers.

Implementation Details: Transferring Surface Data

There are two important ways that surfaces may be transferred. The simple and common approach is the bit-block transfer (blit). Most blits, such as texture blits, volume blits, and surface blits occur when processing a command buffer. The less common approach is the memory mapping interface (NtGdiDdLock, NtGdiDdUnlock, NtGdiDdLockD3D, NtGdiDdUnlockD3D). In real implementations, blits are usually faster, but also requires that the source data be in a linear address range. To preserve linear addresses for large memory regions (i.e., larger than a page) during blits in the Bypass Interface requires use of the backing store in the Bypass Interface server.

In some cases, it is possible to avoid the storage and bandwidth of the backing store by using the Direct3D memory mapping interface. When performing a blit, the host acquires an address to the destination surface using a call to NtGdiDdLock or NtGdiDdLockD3D. Instead of copying surfaces from guest memory to the backing store, the host places the copies directly at the mapped destination surface pointer. When the copy is complete, the host releases the surface pointer using the corresponding call to NtGdiDdLock or NtGdiDdLockD3D.

Not all surfaces are explicitly transferred. When NtGdiD3DDrawPrimitives2 is called, the command buffer may reference surfaces located in guest user memory. For example, on graphics adapters that lack vertex processing acceleration (such as Intel embedded graphics adapters), vertex data is located in user memory. The host should scan the command buffer for guest user memory surfaces when servicing NtGdiD3DDrawPrimitives2. The guest user memory surfaces are cloned into host memory surfaces stored in the backing store, and references to the guest surfaces are updated to the corresponding host memory surfaces.

One need not copy the entire user memory surface every time. In the case of vertex data, the command buffer usually has information about which ranges of the vertex data will actually be used, and only these ranges need to be transferred. Some user memory surfaces rarely change their contents. For example, vertex data for a static model may never change after it is loaded once. In this case, the page tracking mechanism greatly helps.

Implementation Details: the Primary Surface

The primary surface is a special surface that represents the actual display device (i.e., the pixels displayed on the screen). The primary surface requires special consideration because the guest display device is emulated by the virtual machine monitor.

When a guest process requests a primary surface, the host creates one on behalf of the guest. However, the host creates a primary surface based on the actual display device rather than the emulated one in the guest. Operations on the virtualized primary surface must be performed as if the primary surface had the properties of the guest device.

When a guest Direct3D window presents a rendered image, the window surface is blitted to the primary surface using NtGdiDdBlt. When handling NtGdiDdBlt calls, the host should add an offset to compensate for the position of the guest window within the host desktop. NtGdiDdBlt calls should also clip the extents of the transfer when the extents of the guest display device exceed the bounds of the host primary surface.

If the guest window is occluded by other guest windows, Direct3D generates several blits to prevent Direct3D windows from drawing over occluded windows. However, the client API in the guest is ignorant of host window sizes and locations, and will inadvertently draw over them. To prevent this, blits that intersect host windows are subdivided to prevent host windows that occlude the virtual machine window from being drawn over. This is accomplished by injecting proxy windows in the guest to suppress rendering and blitting to inappropriate locations.

If the guest attempts to read from the primary surface, then the host should prevent information about the host frame buffer from leaking into the guest. Parts of the primary surface that do not belong to guest should not be revealed. The returned image should not contain pixels outside the virtual machine window. The contents of occluding host windows should be censored by blacking them out in the returned image.

For highest performance, Direct3D applications may request exclusive access to the primary surface and perform full screen rendering. In exclusive mode, Direct3D does not need to use blits to present surfaces. However, requests for exclusive access should not be automatically granted to the guest, and the guest should not be able to arbitrarily modify the display mode. Instead, Direct3D exclusive access and display mode changes should only be granted when the virtual machine has already been granted full-screen mode by the user.

Implementation Details Window Occlusion and Mouse Cursor Handling

In current 3D graphics systems, the guest video driver handles clipping rendered imagery to the visible window, preventing the 3D graphics from overwriting windows stacked on top. Bypass virtualization of 3D graphics bypasses the guest kernel and hence the guest video driver. As a result, some additional information must be passed between the guest and host. To implement window occlusion on Direct3D, the host doesn't need to do anything special because the guest application is responsible for drawing only to areas it is allowed. The Direct3D low-level API indicates that application attempts to blit to the front buffer can be rejected if there are any windows occluding the area being updated. Then Direct3D application-level DLL (e.g., D3D8.DLL) is responsible for asking the windowing system of the guest for the non-occluded region and reissuing a series of blits which do not overlap with other windows.

When doing bypass virtualization, the intercept module must replicate part of this function for the guest, as the system bypasses the guest's rejection code and only using the host's rejection code. To replicate the guest rejection code, the intercept module asks the guest windowing system for the regions that are visible (e.g., using GetWindowRgn in Win32 API) and rejects an application's request to draw to non-visible areas. Then, the guest application will update its view of the windows on the screen and send updated drawing requests which will succeed. Those skilled in the art will recognize that this function can be placed in a separate module too.

For other graphics subsystems, e.g., some OpenGL implementations, the API does not allow us to reject blits and shifts the challenge to the application. In these subsystems, the host will be passed a description of the geometry of the guest visible region. The host must intersect the guest visible region of the window with the host visible region (i.e. take into account the occlusion of host windows) to come up with the final visible region on the host screen.

Alternately, for Direct3D, the guest could be responsible for this task since Direct3D requires the client application to ensure it doesn't draw on other windows. The host could send a description of shapes and position of the visible windows to the guest. The guest could then only update the appropriate regions of the screen. Because the application decides which region to update, the Bypass Interface server could make the Direct3D call that tries to blit fail if it would occlude any host window. Then the guest would know that there are host windows occluding it. The intercept module would fetch the occluding shapes from the host and make fake windows in the guest operating system which occlude the application window in the guest operating system. These would have shapes that matched the host windows. The Direct3D code that queries the visible region would then generate the blits for just the portions that were visible on the host.

Another approach for window occlusion would be to have the guest generate a few extra commands that cause the graphics card to write an alpha mask or color key to the rendered image in the non-visible portions. The host also could convert its window geometry into similar bundle commands that it would silently execute on the video buffer before swapping. All requests to swap/flip the buffer could be converted to alpha aware or color-keyed blits so the guest window shapes would not need to be explicitly passed.

An efficient implementation of the above techniques will avoid sending the pixel contents of the rendered images/surfaces between video and host memory and can instead send information on what parts of the image should be rendered. For an efficient implementation, the full rendered image that will be presented on the screen is left in video memory to avoid the costly transfer across the local bus (video memory can be more than an order of magnitude faster than other system busses/memory). Regardless of how the image itself is passed back and forth between the guest and the host, in an efficient implementation, the shapes of the windows should be passed back and forth as a compact representation (geometric description) of what parts of that image need to be presented on the screen when consider the possible occlusion by other windows.

A naive implementation that required the host CPU to take an action for every pixel could encode mask information for each pixel and then the host CPU could transfer only the appropriate pixels.

Mouse cursor rendering by the guest must be changed. Because the final image is placed on the screen by the host, guest-level mouse cursor rendering must be disabled (e.g., using ShowCursor in the Win32 API). If it is not, then the square around the cursor which would have been transparent will be filled by the guest with the desktop background from inside the guest.

Implementation Details: Command Buffer State Tracking

A good 3D driver interface will provide a mechanism for user APIs to batch commands destined for the graphics device into a command stream. Segments of the command stream, called command buffers, are sent to the graphics card with a single call that transitions across the user/kernel boundary in the OS. The Windows XP kernel call NtGdiD3dDrawPrimitives2 issues a batch of rendering operations to a graphics device for processing. Special flags designate whether a response to the command data is required and whether the command data can be processed asynchronously. These flags provide cues for how to efficiently communicate the commands from guest to host: the commands can be copied to an auxiliary buffer with a successful response being faked so that processing can continue in the guest.

The command buffers also control the transfer of surface data (textures, vertex buffers, etc) from user mode process memory to video memory. The guest intercept module (e.g., proxy interface) processes the command buffers before issuing them to the host so that only the required surface data is transferred from guest memory to the host backing store. If the command buffer is processed synchronously, the backing store copy for user mode surfaces are freed once they are transferred to local video memory. If the surfaces are referenced later, a new copy is created from the original guest copy. Most texturing operations occur directly from video memory, so the extra backing store copy can be quite wasteful because it is only used if the device driver spontaneously evicts the rendering context state (for example, when the user presses Alt-Tab to move from one full-screen application to another)

Vertex buffers are often kept in user memory, especially when they are dynamically generated by a Direct3D application. To ameliorate the burden of copying large blocks of vertex data from guest to host, the guest proxy tracks the ranges of vertex data that are referenced by commands that issue primitives to the graphics device. A typical graphics drawing command will specify (1) a starting vertex in a buffer and (2) the number of primitives to draw using the vertices that follow the starting vertex. A simple range calculation is made for each drawing command and only the corresponding memory regions that are required to process the command buffer are updated, rather than updating the entire buffer. Sometimes the vertices are referenced through an index buffer, which essentially consists of offsets into a vertex data array. Ranges are computed by scanning the index list, and the same technique is applied to reduce wasteful transfers.

Direct3D has a notion of vertex streams; each stream can be bound to a different surface, or a different section of the same surface. These bindings, along with texture bindings, persist between calls to NtGdiDrawPrimitives2. They are tracked to ensure that the correct surfaces are updated in the host when a guest application attempts to draw objects.

Some operations in the command buffers can write to user process memory. Command buffer tracking identifies the output surface so that they are updated in guest memory. If a buffer's backing store copy has been freed, the host should reallocate a new copy for the buffer before issuing the commands.

Other Bypass Virtualization Opportunities

Bypass virtualization may be used to virtualize other devices, and to provide the guest with new capabilities. The key is to find the appropriate place to build a proxy API using the Bypass Interface. Several opportunities are outlined below.

Media Acceleration

Other forms of media acceleration (e.g., video or audio) may benefit as well. New graphics adapters support high-definition video acceleration, but emulated graphics adapters force video to use a slower, lower-quality software implementation.

The standard way to achieve video acceleration on Windows is to use DirectX Video Acceleration (DXVA), which replaces DirectShow. DXVA uses a dataflow model to build a processing pipeline (a "filter graph," in DirectShow parlance) that handles all of the steps for decoding a video, from interpreting a bitstream to rendering it on a content-protected device.

The filter graph is configured through a software interface. Essentially, an application negotiates with DXVA to build a sequence of processing stages, providing a convenient method to virtualize the DXVA pipeline. The negotiation process actually occurs across the Bypass Interface, and the DXVA pipeline is configured on a host service. The guest sees a proxy pipeline whose sole function is to pass the bitstream from the guest to the host pipeline.

Another, potentially simpler, virtualization approach is available. The Direct3D thunk module, D3D8THK.DLL, also exposes an interface for video acceleration. Specifically, the thunk targets the most intensive parts of video decoding, including motion compensation and de-interlacing. As a straightforward extension of Direct3D virtualization, implementing the video interface of D3D8THK.DLL may enable hardware video acceleration to the guest.

For audio acceleration, VMware Player emulates basic DirectSound for high-performance, low-latency audio playback, but does not support advanced audio effects such as positional audio, Doppler shifting, occlusion, and ambiance effects.

As in Direct3D, there are several options for virtualizing 3D audio. Again, it makes sense to use the bypass approach to virtualize a class of devices at the API level. By order of popularity, choices include Microsoft's DirectSound, the cross-platform OpenAL, and Creative Labs' EAX. Each of these APIs presents a straightforward implementation opportunity for the Bypass Interface. In these APIs, audio waveforms are handled through buffers in a manner analogous to Direct3D surfaces.

2-D Graphics and Printing

Providing hardware accelerated video and 3D graphics adds new capabilities to virtual machines, but much of the graphics workload is still mundane and 2-D (e.g., text rendering and printing). High-performance virtualization of 2-D graphics can yield a better, more responsive user experience than is currently available to virtual machines.

Windows XP renders 2-D through the graphics device interface (GDI) core service implemented in the user module GDI32.DLL. Like Direct3D, GDI avoids providing direct access to graphics resources and exposes only a procedural interface. This allows GDI to provide important features, such as resolution-independent WYSIWYG rendering. For example, GDI-rendered text looks the same on a screen or on a printer despite the radical difference in device resolution. As in Direct3D, the procedural interface makes GDI32.DLL an ideal candidate for bypass virtualization.

Because GDI is also used for printing, applying the bypass virtualization technique to GDI can also make host printers accessible to the guest. This is an important usability feature absent in virtual machines today.

Windows Vista implements GDI using Direct3D version 9, so a virtualized Direct3D version 9 interface is sufficient for providing complete 2-D and some 3D acceleration for Vista guests. Naturally, a Direct3D version 10 implementation is still necessary to accelerate Direct3D version 10 applications.

Windows XP handles window management through the core service implemented in the user module USER32.DLL. By virtualizing the guest window manager, guest windows can be serviced by the host window manager, making virtual guest windows available seamlessly within the host.

USER32.DLL handles color schemes, so virtual guest windows can be drawn with distinctive styles to indicate a sandboxed interface. For example, some OS virtualization products (such as Green Borders) add a colored border around virtualized applications.

For the new Aero style, Windows Vista implements a new desktop window manager in the process DWM.EXE. Desktop compositing allows for a variety of high-quality visual effects (such as window transparency, window thumbnails, window animations), that have become the hallmarks of the rich Windows Vista user experience.

The desktop window manager creates another challenge to achieving seamless virtual windows. While DWM.EXE is running, all graphics rendering operations (both GDI and Direct3D) to top-level windows are redirected to off-screen surfaces. DWM.EXE, then composites these off-screen surfaces onto the desktop, enabling visual effects such as blurred alpha transparency.

If DWM.EXE is running on the host, then it is straightforward to redirect graphics rendering operations to off-screen rendering buffers on the host, and to allow the host DWM.EXE to composite the guest windows among the host windows. For guests using Aero (Vista guests running DWM.EXE), there is already a mechanism to redirect rendering operations to guest off-screen surfaces, and the virtualized Direct3D interface can be used to map these to host off-screen surfaces. Otherwise, the virtualized GDI32.DLL and USER32.DLL interfaces can perform this redirection.

If DWM.EXE is absent from the host, then a different approach is necessary. In general, it would be difficult to implement DWM.EXE on Windows XP because DWM.EXE depends on some key architectural features of the Vista graphics driver model (WDDM). Nevertheless, it is possible to implement a limited form of desktop compositing even lacking a native DWM.EXE implementation.

DWM.EXE depends on the ability to share Direct3D surfaces between processes so that it can composite surfaces created in other processes. However the virtualized Direct3D device maps all guest surfaces into the same process as the bypass interface server. In this case, the shim can composite the guest surfaces to the host desktop using calls to UpdateLayeredWindows. Certain effects (such as blurring) will not be available, but it is possible to achieve correct transparency and provide window thumbnails.

Windows Vista also introduces a new printing architecture. The new print architecture is a processing pipeline that manipulates a document format called XML paper specification (XPS). By standardizing on a document format that is used for all print handling functions (e.g., creation, distribution, spooling, rendering), Vista substantially simplifies the task of virtualizing printers.

As for video, an approach is to virtualize the XPS pipeline. A proxy pipeline on the guest forwards XPS documents to the host XPS pipeline, which provides all of the real functionality. Status notification for the XPS pipeline is asynchronous. The notification mechanism may be implemented through a polling mechanism on the guest, or by using the "reverse" RPC guest service approach.

Sockets

After disks, the next most common I/O is produced by the network. In conventional virtualization, the actual network adapter is emulated. This is overkill for most user processes, which may never directly interact with the adapter. Furthermore, the emulated network adapter may not expose desirable features such as TCP offload or advanced hardware DMA engines.

In Windows, user processes that desire to use network I/O go through the Winsock2 module, implemented in WS2_32.DLL. Implementing Winsock2 with the Bypass Interface bypasses the network adapter emulation. Fortunately, Winsock2 provides a convenient extension mechanism called layered service providers (LSP).

A layered service provider is implemented by a user module that implements the service provider interface (SPI). SPI is similar to a standard BSD socket interface, and is straightforward to implement using the Bypass Interface.

Contexts of the Invention

The invention is not limited to the exemplary embodiments, nor is the invention limited to 3D graphics interfaces nor graphics interfaces generally. The invention also is not limited to the implementation shown in the example within the context of Microsoft® Windows XP or even Microsoft® Windows generally. The invention can be implemented in any computer system or computer landscape that supports virtualization, for any interface.

A resource module does not necessarily correspond to a file. A resource module may be stored in a portion of a file that holds other libraries, in a single file dedicated to the module in question, or in multiple coordinated files.

The invention can be implemented in digital electronic circuitry, or in computer hardware, firmware, software, or in combinations of them. Apparatus of the invention can be implemented in a computer program product tangibly embodied in an information carrier, e.g., in a machine readable storage device or in a propagated signal, for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand alone program or as a module, component, subroutine, or other unit suitable for use in a computing environment. A computer program may exist as software, firmware, or in other contexts. A computer program may be referred to as an application in certain contexts.

Suitable processors for the execution of a program of instructions include, by way of example, both general and special purpose microprocessors, and the sole processor or one of multiple processors of any kind of computer. Generally, a processor will receive instructions and data from a read only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto optical disks; and optical disks. Storage devices suitable for tangibly embodying computer program instructions and data include all forms of non volatile memory, including by way of example semiconductor memory devices, such as EPROM, EEPROM, and flash memory devices; magnetic disks such as internal hard disks and removable disks; magneto optical disks; and CD ROM and DVD-ROM disks. The processor and the memory can be supplemented by, or incorporated in, ASICs (application specific integrated circuits). Both processors and memory may be physically located in many different locations within the computer or within a computer system.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back end component, such as a data server, or that includes a middleware component, such as an application server or an Internet server, or that includes a front end component, such as a client computer having a graphical user interface or an Internet browser, or any combination of them. The components of the system can be connected by any form or medium of digital data communication such as a communication network. Examples of communication networks include, e.g., a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

The invention has been described in terms of particular embodiments. Nevertheless, it will be understood that various modifications may be made without departing from the spirit and scope of the invention. Accordingly, other embodiments are within the scope of the following claims.

What is claimed is:

1. A system, comprising:
 a processor;
 a memory;
 an intercept module that intercepts a function call from an application on a guest operating system, the guest operating system in a virtual machine monitor on a host operating system;
 a forwarding module that forwards the intercepted function call to the host operating system; and
 a remapping module which translates the address space of the guest to the address space of the host such that the host operating system may interpret the function calls from the application on the guest operating system.

2. The system of claim 1, further comprising:
 a guest response module for monitoring the forwarded guest function call and returning at least one response from the host operating system to the application.

3. The system of claim 2, wherein the remapping module is used to translate the address space of the host to the address space of the guest for responses to forwarded guest function calls.

4. The system of claim 2, further comprising:
 an interpretation module that translates the intercepted function call into at least one system call, wherein the at least one system call is processed within the host operating system.

5. The system of claim 4, wherein the interpretation module further translates at least one system call response from the host operating system into at least one function call response readable by the application.

6. The system of claim 5, wherein the forwarded function call includes a specially formed I/O request corresponding to the interpreted function call.

7. The system of claim 5, wherein the intercept module operates in user mode of the guest operating system.

8. The system of claim 5, wherein the remapping module operates in user mode on the host operating system.

9. The system of claim 1, wherein remapping module creates a continuous block of host virtual memory for forwarding the function calls to the host operating system.

10. The system of claim 1, wherein the intercept module is a low-level API within the guest operating system.

11. The system of claim 10, wherein the low-level API within the guest operating system is a thunk library.

12. The system of claim 11, wherein the thunk library corresponds to a sub system of the kernel of the guest operating system, and wherein the kernel sub system controls at least one graphics device driver for rendering 3-D graphics.

13. A method, comprising:
 intercepting a function call from an application on a guest operating system, the guest operating system in a virtual machine monitor on a host operating system on a computer;
 forwarding the intercepted function call to the host operating system on the computer; and
 remapping the address space of the guest to the address space of the host such that the host operating system on the computer may interpret the function calls from the application on the guest operating system.

14. A non-transitory computer-readable storage medium storing instructions that, when executed by a computer, cause the computer to perform a method, the method comprising:
 intercepting a function call from an application on a guest operating system, the guest operating system in a virtual machine monitor on a host operating system on the computer;
 forwarding the intercepted function call to the host operating system on the computer; and
 remapping the address space of the guest to the address space of the host such that the host operating system on the computer may interpret the function calls from the application on the guest operating system.

* * * * *